United States Patent [19]

Bartz

[11] Patent Number: 4,920,174

[45] Date of Patent: Apr. 24, 1990

[54] IMPACT-RESISTANT POLYESTER MOLDING COMPOUNDS

[75] Inventor: Wilfried Bartz, Marl, Fed. Rep. of Germany

[73] Assignee: Huels Aktiengessellchaft, Marl, Fed. Rep. of Germany

[21] Appl. No.: 63,057

[22] Filed: Jun. 17, 1987

[30] Foreign Application Priority Data

Jun. 18, 1986 [DE] Fed. Rep. of Germany ....... 3620432

[51] Int. Cl.$^5$ .............................................. C08L 67/02
[52] U.S. Cl. ...................................... 525/66; 525/131; 525/176; 525/177
[58] Field of Search ........................... 525/66, 131, 176

[56] References Cited

FOREIGN PATENT DOCUMENTS 1124456 8/1968 United Kingdom .
1208585 10/1970 United Kingdom .

*Primary Examiner*—Patricia Short
*Attorney, Agent, or Firm*—Millen, White & Zelano

[57] ABSTRACT

Impact-resistant polyester molding compounds, comprising an intimate mixture of
  A. 60 to 98% by weight of a polyester and
  B. 2 to 40% by weight of a polyalkenamer, optionally containing functional groups, which is treated with from about 0.05 to 5% by weight, relative to the sum of components A and B, of an organic radical former at temperature sufficient to cause said radical former to decompose into free radicals are provided.

16 Claims, No Drawings

IMPACT-RESISTANT POLYESTER MOLDING COMPOUNDS

CROSS REFERENCE TO RELATED APPLICATIONS

This application is related to U.S. Ser. No. 07/040,917, filed on Apr. 21, 1987, and U.S. Ser. No. 07/040,896, filed on Apr. 21, 1987, and now U.S. Pat. No. 4,755,552, whose disclosures are hereby incorporated by reference herein.

BACKGROUND OF THE INVENTION

This invention relates to impact-resistant polyester molding compounds (molding compositions).

Polyesters are known and proven construction materials, which can be processed, e.g., by injection or extrusion processes. In general, polyesters exhibit good toughness and strength. However, for certain uses, improvements in impact strength and notch impact strength, especially at low temperatures, are desirable.

Certain improvements can be obtained by the use of copolyesters which also contain selected diols or dicarboxylic acids (Angew. Makromol. Chemie 128, 203 ff. (1984)). However, to attain good notch impact strengths at temperatures as low as −40° C., these measures are not satisfactory since modification components must be employed in proportions so high that essential properties of the polyesters are lost.

Another attempt to obtain low-temperature impact-resistant polyester molding compounds is the use of polyester blends, i.e., intimate mixtures of thermoplastic polyesters with tough elastomers or tough, high-molecular weight thermoplastics. Special properties of the added polymers can thus be transferred to the polyester blends without destroying the typical polyester properties.

To obtain polyester blends with satisfactory properties, in each case the polymers to be mixed in should be optimized for the specific use and the specific polyester type. Since such special polymers are not available on the market in the necessary variety, in general there is the problem that in each case special products in mostly small amounts must be produced in a cost-intensive way.

Because of these problems, in practice an alternative approach is taken in the production of polyester-blend polymers which requires the use of olefinic polymers, available in large amounts and many varieties, e.g., polyethylene or ethylene/propylene/(diene) copolymers, which exhibit a high low-temperature or notch strength.

The obviously preferred and most effective embodiment of the alternative approach discussed above consists of grafting of high molecular weight olefinic elastomers, e.g., EP(D)M rubbers or hydrogenated styrene/-butadiene block copolymers, with alpha, beta unsaturated carboxyl, carboxy anhydride or carboxylic acid ester monomer derivatives, e.g., maleic acid anhydride, fumaric acid, acrylic acid, methacrylic acid or their esters. Grafting can take place in solution or in the melt with or without addition of radical-forming additives. Such processes are exemplified in U.S. No. 3 882 194 and DE-OS 24 01 149.

All the products that can be used for the alternative method described above must exhibit a high molecular weight and consequently have high melting viscosities, if they are to produce good results in the polyester blends. At the same time optimal properties and efficiency are attained only if the polymers are finely distributed in the polyester matrix. This incorporation causes difficulties because of the high viscosity of the addition polymers and because of the unfavorable polyester/added polymer viscosity relationship. Fluctuations in the flow rate and shearing conditions make the production of a reproducibly good quality difficult. Use of mixing aggregates possessing a high shear strength does reduce the scattering of the values but requires a high energy expenditure and can result in damages to the polyester blends.

SUMMARY OF THE INVENTION

It is an object of the invention to avoid the disadvantages of the prior art while at the same time maintaining the known desired properties of polyester blends.

Upon further study of the specification and appended claims, further objects and advantages of this invention will become apparent to those skilled in the art.

These objects are achieved by providing a polyester molding compound comprising an intimate mixture of
A. from about 60 to about 98% by weight of a polyester having a viscosity number (DIN 53 728, part 3) greater than about 80 cm$^3$/g, and p1 B. from about 2 to about 40% by weight of a polyalkenamer having a viscosity number in the range of from about 50 to about 250 cm$^3$/g (measured according to DIN 53 726 in toluene at 25° C. at a concentration of 0.5 g/100 cm$^3$ of solution),
said mixture having been treated with from about 0.05 to about 5% by weight, relative to the sum of components A and B, of an organic free-radical former at a temperature sufficient to cause said free-radical former to decompose into free radicals.

DETAILED DESCRIPTION

Suitable homo- and co-polyesters include linear, film-forming or fiber-forming, partially crystalline condensation products formed from aromatic dicarboxylic acids having from 8 to 14 carbon atoms and at least one of a diol of the formula HO(CH$_2$)$_n$OH, wherein n is an integer of from 2 to 12, and/or neopentyl glycol and/or 1,4-cyclohexanedimethanol. Up to 20 mol% of the aromatic dicarboxylic acids can be replaced with (cyclo)aliphatic dicarboxylic acids having from 3 to 12 carbon atoms.

The degree of crystallinity of the polyesters should be at least 10%, preferred 25% to 80%, determined by x-ray method (wide angle x-ray scattering).

Preferred polyesters include poly(alkylene terephthalates), preferably poly(ethylene terephthalate) and poly(butylene terephthalate) as well as poly(propylene terephthalate).

Up to 20 mol%, preferably 5 to 15 mol%, of the terephthalic acid in the poly(alkylene terephthalate) can be replaced with aromatic, cycloaliphatic or aliphatic discarboxylic acids. Suitable dicarboxylic acids are those having 3 to 12 C atoms. Examples of suitable dicarboxylic acids include isophthalic acid, phthalic acid, cyclohexane-1,4-dicarboxylic acid, adipic acid, sebacic acid, azelaic acid, decanedicarboxylic acid, etc.

Up to 20 mol%, preferably 5 to 15 mol%, of the main diol of the poly(alkylene terephtalate) can be replaced with different aliphatic or cycloaliphatic diols such as, for example, ethylene glycol, 1,3-propanediol, 1,4-butanediol, 1,6-hexanediol, neopentyl glycol, 1,4- cyclohexanedimethanol, 1,12-dodecanediol, etc. Suitable diols are those having from 1 to 12 C-atoms.

The production of the poly(alkylene terephthalate) employed in accordance with this invention is fully conventional and well known to those of ordinary skill in the art. The usual way of producing them is by transesterification or esterificaton followed by polycondensation of terephthalic acid or its polyester-forming derivatives and the corresponding diol in the presence of catalysts (Soresen and Campbell, Preparative Methods of Polymer Chemistry, Interscience Publishers Inc., N.Y., 1961, pages 111 to 127; Kunststoff-Handbuch, volume VIII, C. Hanser Verlag Munich, 1973, or Journal of Polymer Science, Part A 1, 4, pages 1851 to 1859, 1966, whose disclosures are incorporated by reference herein).

Besides homo- and co-polyesters, polyester mixtures can also be used. The mixing ratios are not critical for the invention.

The polyesters preferably exhibit viscosity numbers greater than 80 cm$^3$/g, preferably from 80 to 240 cm$^3$/g. The viscosity number (J) is determined according to DIN 53 728, part 3.

Suitable polyesters, e.g., poly(alkylene terephthalates) also include block copolyesters. Such products are described, e.g., in Chimia 28 (9), pages 544 to 552 (1974) and in Rubber Chemistry and Technology 50, pages 688 to 703 (1977), whose disclosures are incorporated by reference herein. Besides the above-named aromatic dicarboxylic acids and diols, these block copolyesters contain a poly(oxyalkylene)diol having a molecular weight in the range of about 600 to 2,500. Preferred poly(oxyalkylene)diols are poly(oxyethylene)diol, poly(oxypropylene)diol and poly(oxytetramethylene)diol. The proportion of poly(oxyalkylene)diols is in the range of 4 to 40% by weight, preferably from 10 to 35% by weight (in relation to said block copolyesters).

Polyalkenamers are obtained from cyclic olefins, which exhibit at least one unsubstituted ring double bond, with the help of so-called metathesis catalysts with ring opening by polymerization (DE-OSS 15 70 940, 16 45 038, 17 20 798, 17 70 143 and 18 05 158, DE-AS 12 99 868, GB-PPS 1 124 456, 1 194 013 and 1 182 975, whose disclosures are incorporated by reference herein).

Suitable cyclic olefins include unsaturated hydrocarbons with 4 to 12 (except 6) ring carbon atoms in one or more rings, e.g., 1-3 rings, which in at least one ring exhibit an unsubstituted double bond, which is not in conjugation with other double bonds which may be present and which may possess any degree of substitution; the substituents must not interfere with the metathesis catalysts and are preferably alkyl groups of 1 to 4 carbon atoms or a part of a cyclus of 4 to 8 carbon atoms. Examples are cyclobutene, cyclopentene, cycoheptene, cis- and trans-cyclooctene, cyclononene, cyclodecene, cycloundecene, cis- and trans-cyclododecene, cis-cis-cyclooctadiene-(1,5), 1-methylcyclooctadiene-(1,5), 3-methylcyclooctadiene-(1,5), 3,7-dimethylcyclooctadiene-(1,5).

The double bonds in the polyalkenamers can be present in cis- or trans-form. Preferably, the polyalkenamers have a trans-double bond content such that the polymers exhibit a sufficient crystalline portion that they are practically tack-free at room temperature and thus can be handled well in granular, crumb, shot or powder form, e.g., 50–98% of the total double bond content.

Suitable polyalkenamers are those having molecular weights corresponding to a viscosity number of 50 to 250 cm$^3$/g, preferably 80 to 160 cm$^3$/g, measured at 25° C. in toluene in a concentration of 0.5 g/100 cm$^3$ solution.

Polyalkenamers as such as well as their production are known (K. J. Ivin, Olefin Metathesis, p. 190 ff (1983), Academic Press, whose disclosure is incorporated by reference herein).

The polyalkenamers can have functional groups, e.g., epoxy, carboxyl, carboxylic acid anhydride or ester groups as functional groups can be present in the polyalkenamers.

The introduction of these functional groups into the polyalkenamers takes place according to known processes in solution or in the melt.

Epoxy groups can be introduced, for example, by partial epoxidation of double bonds with peracids. The content of epoxide oxygen should be 0.5 to 9, preferably 3 to 8 weight %. Alternately, useful epoxy derivatives are attained by grafting with, for example, glycidyl methacrylate. Introduction of carboxyl of carboxylic acid anhydride groups takes place by grafting with suitable unsaturated monomers which contain carboxyl or carboxylic acid anhydride groups. Suitable carboxyl and carboxylic acid anhydride compounds are those containing 3 to 20 C atoms. For example, (meth)acrylic acid, maleic acid (anhydride), fumaric acid, maleic acid monoester, fumaric acid monoester, norbornene dicarboxylic acid anhydride, itaconic acid (anhydride) as well as the corresponding methyl or ethyl esters of these acids can be employed. Based on experience, a content of grafted monomer of 0.2 to 5% by weight, preferably 0.5 to 4% by weight in relation to the modified polyalkenamer is sufficient.

Modification of the polyalkenamers is not part of this invention. A person of ordinary skill in the art can readily optimize the conditions required by routine optimization experiments and can readily determine by a simple test whether a sufficient degree of grafting exists. Besides the functional groups according to the invention, other functional groups or substituents can be introduced. All modification measures should be performed so that no cross-linking and/or disturbing increase of molecular weight in the polyalkenamers occur. The gel content of the modified polyalkenamers, determined as insoluble portion in hot toluene, must be less than 10% by weight, preferably less than 5% by weight.

Besides components A and B, the molding compounds can also contain an additional component C selected from those discussed below. Thus, they can contain epoxy resins with an average molar epoxide functionality of 1.5 to 3. Examples are glycidyl ether derivatives of phenolic or aliphatic compounds with at least 2 hydroxy groups, or glycidyl ester derivatives of aromatic or aliphatic compounds, containing 2–4 carboxylic groups, etc.

Glycidyl ether derivatives of bisphenol A with epoxy contents greater than or equal to 0.08 mol/100 g are preferred. The molding compounds can also contain isocyanates. Isocyanates having an average of 1.8 to 4, preferably 2 to 3.5 NCO groups per mole, are suitable. Examples are 2,6- or 2,4-toluene diisocyanate, bis-(p-isocyanatophenyl)methane, hexamethylene diisocyanate, isophorone diisocyanate, or derived polyisocyanates, etc. Aliphatic isocyanates are preferred, especially isophorone diisocyanate and its higher molecular weight derivatives, such as cyclotrimerized isophorone diisocyanate (U.S.-PS No. 3 919 218, whose disclosure is incorporated by reference herein).

With the use of these modified polyalkenamers, the molding compounds according to the invention contain, besides the polyester, from 2 to 40% by weight, preferably from 5 to 30% by weight, of polyalkenamer. The polyester is present in an amount of from about 60 to 98% by weight, preferably from about 70 to 95%. If the molding compound also contains component C, then C is present in the molding compound in an amount of from 0.1 to 5% by weight, in relation to the sum of components A and B.

In a further embodiment of the invention the polyalkenamers can also be used directly, i.e., without a modification with the end groups or other functional groups discussed above.

In such a case it is advantageous to employ polyesters whose dicarboxylic acid portion consists of at least 50 mol% of terephthalic acid and which contain a total of at least 5 mol%, preferably 20 to 30 mol%, of diols of the general formula $$HO-(CH_2)_n-OH \qquad I$$

and/or of dicarboxylic acids of general formula $$HOOC-(CH_2)_{n-2}-COOH \qquad II$$

wherein n is an integer greater than or equal to 8, preferably from 8 to 14. The content of these diols or dicarboxylic acids is related to the total amount of diols and dicarboxylic acids. The polyesters can also contain the other above listed diols and dicarboxylic acids to make up the total content of diols and dicarboxylic acids in the polyester.

When unmodified polyalkenamers are used, the molding compounds of the invention should contain, in addition to the polyester, in general from about 2 to 30% by weight, preferably 5 to 25% by weight of polyalkenamer. In such a case component C can be omitted.

It is essential for the molding compounds according to the invention that the polyalkenamers first be finely dispersed in the polyester by melt mixing before the activation, i.e., decomposition, of the organic radical former into free radicals. The average particle diameter of the polyalkenamer phase should be smaller than or equal to 10 microns, preferably smaller than or equal to 1 micron. Working in of the polyalkenamers is conveniently carried out in a commercial twin-screw kneader. When screws are used, the mixing action can be augmented with, e.g., kneading blocks or toothed disks, and high throughputs can thereby be attained. The temperature of the melt is preferably maintained at about 10° to 80° C. above the melting temperature of the polyesters.

This is exemplary of intimate mixing for the invention, other equivalent mixing techniques being fully applicable.

Commercially available azo compounds or peroxides, preferably dialkyl peroxides or alkyl peracid esters, are particularly suitable as organic radical-formers for treatment of the molding compounds.

Suitable organic radical formers include those which are stable at room temperature and which form free radicals at elevated temperatures, e.g., at 80° C. or higher. The half-lives should be preferably equal to or less than 10 min. at 350° C.

Examples of particularly suitable radical formers are t-butylperneodecanoate, t-amylperpivalate, t-butylperpivalate, bis-(3,5,5-trimethylhexanoyl)peroxide, dioctanoylperoxide, didecanoylperoxide, dilauroylperoxide, t-butyl-per-(2-ethylhexanoate), t-butylperisobutyrate, t-butyl-permaleinate, 1,1-bis-(t-butylperoxy)-3,3,5-trimethyl-cyclohexane, 1,1-bis-(t-butyl-peroxy)-cyclohexane, t-butylperoxyisopropylcarbonate, t-butyl-per-(3,5,5-trimethylhexanoate), 2,5-dimethylhexane-2,5-diperbenzoate, t-butylperacetate, t-butyl-perbenzoate, 5-amyl-perbenzoate, 2,2-bis-(t-butyl-peroxy)-butane, dicumylperoxide, 2,5-dimethylhexane-2,5-di-t-butylperoxide, t-butyl-cumylperoxide, bis(t-butyl-peroxy)-3,5-dimethyldioxolane-1,2, di-t-butylperoxide, 2,5-dimethyl-hexine-(3)-2,5-di-t-butylperoxide, bis-(t-butyl-peroxy-isopropyl)-benzene as well as especially 2,2'-azo-bis-(2-acetoxybutane) and 2,2'-azo-bis-(2-acetoxypropane).

Bis-t-alkylperoxides and t-alkyl peracid esters are especially preferred.

The organic radical formers are used in amounts of from about 0.05 to 5% by weight, preferably of 0.1 to 3% by weight, in relation to the total amount of components A and B and optionally C.

Treatment of the mixtures of A and B with the organic radical formers according to the invention can take place in various ways. Appropriate radical formers can be incorporated into the melt even during or immediately after mixing of A and B, under conditions that still do not cause any spontaneous decomposition of the radical formers. Optionally they can then speedily be decomposed by raising of the temperature. The mixture of A and B can also be prepared separately. The organic radical former can then be added at other stages, e.g., during incorporation of other auxiliary agents and additives. In such a case, the radical former would also be added to the mixture along with such agents and additives and allowed to act.

It is also possible to add the radical former in liquid form to the mixture of A, B and optionally C in solid granular form and allow it to diffuse in it, without decomposition occurring. In this case, the radical formers should be stable at the selected application temperature and be in liquid form; radical formers are preferred which are liquid at 50° C., preferably at 23° C. Alternatively it is also possible to apply the radical formers in solution. The solvents can be removed again during or after the decomposition phase by application of vacuum (e.g., degassing stage during extrusion). Suitable solvents can be readily determined by those of ordinary skill in the art. Introduction of the radical formers together with liquid auxiliary agents and additives is advantageous if no disturbance of the decomposition of the radical formers occurs. The vapor pressure of the radical formers during the impregnating phase should be below 1 bar to avoid the need for additional technical measures.

For the necessary decomposition and action of the radical former, it is sufficient, e.g., to heat the granulate treated with the radical former to a temperature which is above the decomposition temperature and at which the radical former exhibits a suitable half-life. With respect to the molding compound in this case the temperature should be at least 10 K., preferably at least 25 K., below the melting or softening temperature.

A person of ordinary skill in the art can readily choose a suitable radical former perhaps with a few routine optimization experiments. The choice involves conventional considerations of the decomposition temperature or the temperature-dependent half-life of the decomposition of the radical former and the given decomposition conditions (e.g., longer time in the class of relatively low temperature in solid phase or shorter time in the case of high temperature in the melt). These must be optimized with one another with consideration of the thermostabilitiy of the molding compound. Appropriate product data of the radical formers are known in the literature. In general with a homogeneous distribution of the radical former in the melt or in the solid phase an action time of about 4 half-lives at the respective temperature is sufficient.

Besides components A and B, and optionally component C, the usual auxiliary agents and additives such as stabilizers, processing agents, antistatic agents, coloring or flameproofing agents, etc., can be incorporated in the molding compounds of the invention. It is also possible to use fillers and reinforcing fillers, such as minerals, glass or carbon fibers, micro glass balls, carbon black and the like.

Polymer additives, e.g., impact-resistant modifiers, etc., can also be used in minor amounts.

If desired, the molding compounds according to the invention can be subjected to a thermal aftertreatment. For this purpose, the mass present as granulate is heated in the absence of oxygen for several hours, preferably in a fluid bed, to a temperature greater than or equal to 5 K. below the temperature at which melting begins. Preferably the temperature is at least 150° C. The thermal aftertreatment can also advantageously be performed according to the methods described in DE-PSS 30 33 468 and 33 33 469. The thermal aftertreatment can also be performed in a vented extruder.

The molding compounds according to the invention exhibit the unexpected advantage that, relative to the prior art, it is possible to work lower-molecular weight, low-viscosity polymers as the additives improving the impact strength, which are consequently better able to be worked in, and that in a further development of the invention it is even possible to do without a modification (functionalizing) of the polyalkenamer.

The molecular weights are determined in the case of the polyester as viscosity number (J), measured according to DIN 53 728, part 3, in a mixture of o-dichlorobenzene and cresol (weight ratio 1:1) in a concentration of 0.5 g/100 cm$^3$, and in the case of the polyalkenamer as viscosity number (J), measured at 25° C. in toluene according to DIN 53 726 in a concentration of 0.5 g/100 cm$^3$.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

In the examples, the notch impact strength tests according to DIN 53 453 were performed on injection molded standard small bars at the indicated temperatures. Between the injection molding and tests the bars were stored for about 24 hours at 50% relative humidity (23° C.).

Examples identified by letters are not according to the invention.

EXAMPLES

Production of polyalkenamers exhibiting functional groups

A commercial polyoctenamer (J: 120 cm$^3$/g; transcontent of the double bonds: about 80%—VESTENAMER ® 8012) was the basis as initial product (TOB V) for the functionalized polyoctenamers used in the examples. Functionalized polyalkenamers (TOR 1 to 4) were produced therefrom.

TOR 1

2 parts by weight of fumaric acid and 98 parts by weight of polyoctenamer were reacted in a twin-screw extruder (Model ZE 40—Berstorff company) at 310° C. and then granulated. From the comparison of the IR spectrum of the initial extrudate and of TOR 1, purified by reprecipitation of free monomers, it could be recognized that more than or equal to 80% of the fumaric acid is bound.

Gel content: less than 1% by weight
Viscosity number (J): 111 cm$^3$/g

TOR 2

Corresponding to TOR 1 a product was produced of 4 parts by weight of fumaric acid and 96 parts by weight of polyoctenamer.

Reaction temperature: 310° to 315° C.
Gel content: 2 to 3% by weight
Viscosity number (J): 112 cm$^3$/g

TOR 3

Polyoctenamer was epoxidized in chloroform in known way with $H_2O_2$/formic acid and precipitated by stirring in, in methanol. The acid-free washed powdery product contained 7.15% by weight of total oxygen; by titration with 0.1N HCl in tetrahydrofuran an epoxide oxygen content of 6.4% by weight was found.

Gel content: less than 1%
Viscosity number (J): 107 cm$^3$/g

TOR 4

A free-flowing mixture of 90 parts by weight of TOR V, 5 parts by weight of hydroxyethyl methacrylate, 3.3 parts by weight of kaolinite and 1.7 parts by weight of pyrogenic silicic acid was reacted in a twin-screw mixer (Model 30.34; Leistritz company) at 307° to 309° C. and granulated. From the comparison of the IR spectra (ester absorption band around 1 730 cm$^{-1}$) of the raw product and of TOR 4, purified by reprecipitation of residual monomer, a reaction of the hydroxethyl acrylate of about 85% could be calculated.

Gel content: less than 2% by weight
Viscosity number (J): 114 cm$^3$/g

EXAMPLES 1 TO 4 AND A (TABLE I)

A commercial poly(butylene terephthalate) (J: 110 cm$^3$/g; VESTODUR ® 1000) and the polyalkenamer TOR 1 were mixed, in the amounts indicated in Table I, in a laboratory twin-screw kneader (Model DSK 42/5—Brabender Co.) at about 260° C. and 20 rpm of the screws, extruded as strand, granulated and dried. The poly(butylene terephthalate) and half of the mixtures with TOR 1, after drying, were injection molded into standard small bars for comparison purposes. The remaining amounts of the mixtures with TOR 1 were thermally treated with 1% di-t-butyl peroxide at room temperature, then first 3 hours at 90° C., then 4 hours at 150° C. and then 20 hours at 200° C. in a vacuum (less than or equal to 2 mbars). The granulates thus obtained were also injection molded into standard small bars and subjected to notch impact testing according to DIN 53 453.

TABLE I

| Example | PBTP* % wt | TOR type | TOR % wt | Peroxide treatment |
|---|---|---|---|---|
| A | 100 | — | 0 | no |
| B | 95 | TOR 1 | 5 | no |
| 1 | 95 | TOR 1 | 5 | yes |
| C | 90 | TOR 1 | 10 | no |
| 2 | 90 | TOR 1 | 10 | yes |
| D | 80 | TOR 1 | 20 | no |
| 3 | 80 | TOR 1 | 20 | yes |

| | Notch impact strength [kJ/m²] | | | |
|---|---|---|---|---|
| Example | 23° C. | 0° C. | −20° C. | −40° C. |
| A | 4 | — | — | 3 |
| B | 3.6 | 3.6 | 3.7 | 3.5 |
| 1 | 11.2 | 8.2 | 7.1 | 5.7 |
| C | 3.8 | 3.6 | 3.7 | 3.7 |
| 2 | 12.6 | 10.0 | 8.1 | 7.2 |
| D | 4.8 | 4.7 | 4.7 | 4.1 |
| 3 | wf** | 10.3 | 8.2 | 7.5 |

*poly(butylene terephthalate)
**without fracture

EXAMPLES 4, 5 AND E (TABLE II)

80 parts by weight of poly(butylene terephthalate) of example 1 and 20 parts by weight of TOR 2 were mixed in a twin-screw kneader (Model ZE 40, Berstorff company) at about 250° C. mass temperature and then granulated.

A first part of the mixture was directly thermally aftertreated ("N") at 200° C. for 20 hours at about 3 torr and subjected to the notch impact strength test (example E). A second part, before testing, was thermally treated as above and then with 1% by weight of t-butyl perbenzoate ("P") (3 h/90° C. and 2 h/150° C.) (example 4). A third part was treated analogously to the second part, with the difference that the sequence of treatment steps was reversed (example 5).

TABLE II

| Example | Aftertreatment |
|---|---|
| E | N |
| 4 | N, then P |
| 5 | P, then N |

| | Notch impact strength [kJ/m²] | | | |
|---|---|---|---|---|
| Example | 23° C. | 0° C. | −20° C. | −40° C. |
| E | 11.7 | 8.0 | 6.8 | 6.0 |
| 4 | 40% wf* 31.8 | 11.8 | 9.8 | 8.5 |
| 5 | 70% wf* 42.5 | 16.4 | 12.0 | 9.0 |

EXAMPLES 6 AND F (TABLE III)

80 parts by weight of poly(butylene terephthalate) of example 1 and 20 parts by weight of TOR 3 were mixed in a twin-screw kneader (Model 30.34; Leistritz company) at 260° C., then granulated and dried. In example F this mixture was injection molded, without further aftertreatment, into standard small bars, in example 6 the mixture was treated beforehand with 1% by weight of di-t-butyl peroxide at 90° C. and, after the granulate was superficially dried, it was heated in the course of 3 hours to 200° C. and kept at this temperature for 5 hours.

TABLE III

| Example | Peroxide treatment |
|---|---|
| F | no |
| 6 | yes |

| | Notch impact strength [kJ/m²] | | | |
|---|---|---|---|---|
| Example | 23° C. | 0° C. | −20° C. | −40° C. |
| F | 7.5 | 6.4 | 5.1 | 4.4 |
| 6 | wf* | 13.9 | 10.1 | 7.5 |

*without fracture

EXAMPLE 7

80 parts by weight of a poly(butylene terephthalate) (J=145 ml/g) under the same conditions as in example 6 was mixed with 20 parts by weight of TOR 4, granulated and aftertreated with peroxide. The notch impact strength test showed at 23° C. test temperature at 55% no fracture of the test sample and at −20% a value of 8.3 kJ/m².

EXAMPLES 8, 9, G AND H (TABLE IV)

80 parts by weight of the poly(butylene terephthalate) of example 1 and 20 parts by weight of TOR 1 were mixed in a twin-screw kneader, whose cylinder consists of 8 equally long shots, in which in the first shot 40 parts by weight of poly(butylene terephthalate) and the entire TOR 1 and in the fifth shot the remaining portions of the poly(butylene terephthalate) were dosed. The mixture obtained was further processed without (example G) and with peroxide treatment (1% by weight of di-t-butyl peroxide; 3 h at 90° C.—example 8). In a further test, 1% by weight of commercial trimer isophorone diisocyanate (IPDI—T 1890, Huels AG) was added together with the poly(butylene terephthalate) in the fifth shot; this mixture originally (example H) and after peroxide treatment was injection molded into test bars (example 9) and tested for notch impact strength.

TABLE IV

| Example treatment | IPDI* | Peroxide |
|---|---|---|
| G | no | no |
| 8 | no | yes |
| H | yes | no |
| 9 | yes | yes |

| | Notch impact strength [kJ/m²] | | | |
|---|---|---|---|---|
| Example | 23° C. | 0° C. | −20° C. | −40° C. |
| G | 3.6 | 3.2 | 3.3 | 3.3 |
| 8 | 19.4 | 13.6 | 11.2 | 6.9 |
| H | 18.3 | 5.6 | 4.5 | 3.6 |
| 9 | wf** | 12.8 | 10.8 | 8.1 |

*trimer isophorone diisocyanate
**without fracture

EXAMPLES 10 TO 12, I TO N (TABLE V)

20% by weight of the polkyalkenamer TOR V is mixed with 80% by weight of poly(butylene terephthalate), in which various portions of terephthalic acid are replaced by 1,12-dodecanedioic acid, in a laboratory twin-screw kneader (Model DSK 42/5, Brabender company) at 250° to 260° C., then granulated and dried. 1% by weight of di-t-butyl peroxide is applied to the granulate at room temperature and the temperature, with constant circulation of the granulate with a nitrogen cover, is raised to 90° C. and after 3 h to 150° C. for another 3 h. The products thus obtained are injection molded and tested for notch impact strength.

TABLE V

| Example | J/cm³/g/ | PBTP* mol % DDS** |
|---|---|---|
| I | 107 | 0 |
| K | 107 | 0 |
| L | 117 | 8 |
| 10 | 117 | 8 |
| M | 180 | 15 |
| 11 | 180 | 15 |
| N | 142 | 25 |
| 12 | 142 | 25 |

| | TOR V | Notch impact strength [kJ/m²] | |
|---|---|---|---|
| Example | % wt | 23° C. | −40° C. |
| I | 0 | 4.0 | 3.0 |
| K | 20 | 3.3 | 2.3 |
| L | 0 | 2.8 | 2.8 |
| 10 | 20 | 8.8 | 5.1 |
| M | 0 | wf*** | 4.2 |
| 11 | 20 | wf | 8.6 |
| N | 0 | wf | 4.4 |
| 12 | 20 | wf | 8.8 |

*poly(butylene terephthalate)
**1,12-dodecanedioic acid;
***with fracture

EXAMPLES 13, 14, O, P (TABLE VI)

20% by weight of TOR V and 80% by weight of a poly(butylene terephthalate cododecandioate) with 15 mol% of 1,12-dodecanedioic acid, J = 100 cm³/g, as was mixed as in examples 10 to 12 in a laboratory twin-screw kneader. The initial polyester as well as a part of the mixture obtained were directly processed and tested (examples O, P). The remaining granulate of the mixture, as in example 10, was aftertreated with peroxide ("P"); the one half of the molding compound according to the invention was then injection molded and tested (example 13), while the second half, before processing, was subjected to a thermal aftertreatment ("N") at 195° C./16 h at 2 to 3 mbars.

TABLE VI

| Example | TOR V % wt | Aftertreatment | |
|---|---|---|---|
| O | 0 | — | |
| P | 20 | — | |
| 13 | 20 | P | |
| 14 | 20 | P, then N | |

| | Notch impact strength [kJ/m²] | | | |
|---|---|---|---|---|
| Example | 23° C. | 0° C. | −20° C. | −40° C. |
| O | 5.2 | 1.5 | 1.4 | 1.4 |
| P | 3.6 | 2.8 | 2.4 | 2.3 |
| 13 | 18.3 | 10.1 | 7.6 | 5.6 |
| 14 | wf* | 3/11 pf** 30.4 | 15.9 | 12.4 |

*without fracture
**partially fractured

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. An impact-resistant polyester molding composition, comprising an intimate mixture of
 A. 60 to 98% by weight of a polyester having a viscosity number greater than about 80 cm³/g,
 B. from about 2 to 40% by weight of a polyalkenamer having a viscosity number in the range of from about 50 to about 250 cm³/g, and
 C. 0.1 to 5% by weight of an isocyanate having an average of from 1.8 to 4 NCO groups per mole,
said mixture having been treated with from about 0.05 to about 5% by weight, relative to the sum of components A and B, of an organic free-radical former at a temperature sufficient to cause said free-radical former to decompose into free radicals.

2. A composition of claim 1, wherein said polyester is present in an amount of from about 95 to 70% by weight and said polyalkenamer is present in an amount of from about 5 to 30% by weight.

3. A molding composition of claim 1, wherein said polyester comprises the condensation product of an aromatic dicarboxylic acid having from 8 to 14 C atoms and at least one of
 A. a diol of the formula
 $HO(CH_2)_nOH$ wherein n is an integer of from 2 to 12,
 B. neopentyl glycol, and/or
 C. 1,4-cyclohexanedimethanol or mixtures thereof.

4. A molding composition of claim 1, wherein not more than 20 mol% of said aromatic dicarboxylic acid is replaced with a cycloaliphatic or aliphatic dicarboxylic acid having from 3 to 12 C atoms.

5. A molding composition of claim 1, wherein said polyester is a polyalkylene terephthalate.

6. A molding composition of claim 1, wherein said polyester is a block copolyester.

7. A molding composition of claim 6 wherein said block copolyester contains from about 4 to 40% by weight of a polyoxyalkenylene diol having a molecular weight of from about 600 to 2,500.

8. A molding composition of claim 7 wherein said block copolyester contains from about 10 to 35% by weight of said polyoxyalkylene diol.

9. A molding composition of claim 1, wherein said polyester comprises a condensation product of at least 50 mol% of terephthalic acid and at least 5 mol% of a diol of the formula $HO-(CH_2)_n-OH$ and/or of a dicarboxylic acid of the formula $HOOC-(CH_2)n-s-COOH$ wherein n is an integer of 8–14 and said polyalkenamer is unmodified.

10. A molding composition of claim 1, wherein said polyalkenamer has a viscosity number of from about 80 to 160 cm³/g.

11. A molding composition of claim 1, wherein said polyalkenamer is functionalized by epoxy, carboxylic acid, carboxylic acid anhydride or ester groups.

12. A molding composition of claim 11 wherein the content of epoxide oxygen in said polyalkenamer is from about 0.5 to 9 weight %.

13. A molding composition of claim 1 wherein said isocyanate is cyclotrimerized isophorone diisocyanate.

14. A molding composition of claim 1, wherein said organic radical former is an azo compound or a peroxide.

15. A molding composition of claim 1, wherein said organic radical former is a bis-t-alkylperoxide or a t-alkyl peracid ester.

16. In a molded product, prepared from a molding composition, the improvement wherein the molding composition is one of claim 1.

* * * * *